3,325,493
PROCESS FOR PRODUCING CYANURIC ACID FROM MELAMINE PURIFICATION WASTE MOTHER LIQUOR
Katsusaburo Shimamura, Kawasaki-shi, Atsushi Matsushima, Tokyo, and Shuji Yoshida, Yokohama, Japan, assignors to Showa Denko Kabushiki Kaisha, Tokyo, Japan, a corporation of Japan
No Drawing. Filed Aug. 10, 1964, Ser. No. 388,687
Claims priority, application Japan, Aug. 13, 1963, 38/41,918
17 Claims. (Cl. 260—248)

This invention relates to a process for producing cyanuric acid from the waste mother liquor resulting after the purification of melamine (hereinafter referred to as melamine purification waste mother liquor) by converting melamine and other triazine derivatives contained therein into cyanuric acid.

Numerous proposals have been made in relation to processes for producing cyanuric acid from the triazine derivatives such as melamine, ammeline and ammelide. However, there has not been known such a process for producing economically cyanuric acid by which the small amounts of the aforesaid triazine derivatives that are contained in a dilute aqueous solution like the melamine purification waste mother liquor is converted into cyanuric acid and then recovered.

Melamine is normally produced commercially by using dicyanadiamide or urea as the starting materials. The crude melamine obtained by these processes usually needs to be purified. As processes for purifying the crude melamine, the processes practiced commercially are the recrystallization and the sublimation processes, the former being adopted in most cases. The recrystallization process is carried out by dissolving melamine in an aqueous alkaline solution with heat, filtering off the insoluble substances, then depositing the melamine crystals with cooling and thereafter separating the crystals from the melamine purification mother liquor. In this case, for preventing the loss caused by wasting melamine being dissolved in the mother liquor, the mother liquor used for carrying out the melamine recrystallization is recycled and reused. In this liquor, however, alkali-soluble impurities accumulate gradually, with the consequence that the purity of melamine separated gradually declines. Consequently, a part or all of the melamine purification mother liquor in which the impurities have accumulated must be renewed. In this case, there are contained in the melamine purification waste mother liquor at least a saturation amount (e.g. about 0.4% at room temperature) under the processing conditions at which the separation of crystals is carried out, of melamine as well as a small amount (e.g. 0.5–1.3%) in the form of alkali salts, of ammeline and ammelide, which have been accumulated as impurities, though there exists some differences depending upon the conditions under which the purification operation has been carried out. And also, melamine, ammeline and ammelide that are contained in the waste mother liquor, because of their difficulty of carrying out the economical recovery, has been discarded with the waste mother liquor without being utilized.

We found it possible to obtain cyanuric acid economically from the waste mother liquor resulting from the purification of melamine, as hereinbefore described, by adding cyanuric acid to the aforesaid waste mother liquor to convert melamine contained therein to melamine cyanurate, then neutralizing the liquor to obtain precipitates of melamine cyanurate, separating this together with ammeline and ammelide precipitates which have been deposited concurrently, and thereafter subjecting the separated precipitates to the hydrolysis under strongly acidic conditions to convert said precipitates into cyanuric acid. Cyanuric acid obtained in this manner consists of the preliminarily added cyanuric acid, cyanuric acid formed by the hydrolysis of melamine cyanurate to which melamine was converted, and cyanuric acid formed by the hydrolysis of ammeline and ammelide.

It was also found by us in carrying out the above separation of the precipitates that this could be facilitated remarkably by the use of the hereinafter indicated specific anionic polymer electrolyte as a precipitation assistant.

In addition, we found that it was of great advantage to use a part of the aforesaid hydrolyzed waste mother liquor resulting after the separation of cyanuric acid, for neutralizing the melamine purification waste mother liquid and then to utilize the remainder again in the hydrolysis step.

Hence, according to the present invention, the melamine need not be separated from the other triazine derivatives, but they can be all converted readily to cyanuric acid.

The invention is described in further detail hereinafter. When, after adding an equivalent or somewhat excess of cyanuric acid to melamine remaining dissolved in the melamine purification waste mother liquor, the neutralization is effected with sulfuric acid, melamine becomes melamine cyanurate and is separated along with ammeline and ammelide. This neutralization must be so carried out that the pH of the liquor may be varied over the range from 8 to 5.5. It was found that the separation would become incomplete outside of this pH range.

Although the above-described addition of cyanuric acid may be effected after the neutralization, its solubility is greater when carried out on the alkaline side and hence it is favorable and advantageous for carrying out its addition reaction with the melamine. The crystals of the aforementioned precipitates are of a size averaging about 0.1–10 microns and together with the liquor exhibits as a whole a gelled state. For this reason, its separation into a solid and liquid invites much difficulty. If a specific anionic polymer electrolyte is added in a small amount as a precipitation assistant to the gel-like liquor containing the precipitate particles and the whole liquor is stirred slowly, the gel-like liquor separates into a supernatant liquid and a coagulated flocculent precipitate, particle size of which are from 5 mm. to 30 mm. As the sedimentation velocity of this flocculent precipitates is relatively high, it can be readily separated from the liquid. In this case, it is believed that the amino and the hydroxyl radicals contained in the molecules of the triazine derivatives bond with the anions of the precipitation assistant to form the flocs. The specific precipitation assistant that can be used effectively in the present invention include the alkali and ammonium salts of polyacrylic acid, the alkali and the ammonium salts of the partially hydrolyzed product of polyacrylonitrile, and the alkali and ammonium salts of the partially hydrolyzed product of polyacrylamide. Although, as precipitation assistants, besides said species, are generally known sodium alginate and sodium carboxymethylcellulose, none of these are effective in the present invention.

The precipitation assistant can be added with equally effective results before or after the deposit of the precipitates. As the amount of the precipitation assistant to be added is increased, the sedimentation velocity of the flocs becomes higher. However, if the proper amount is exceeded, the sedimentation of the flocs is not only retarded, but the supernatant liquid becomes turbid, and in addition the complete separation becomes difficult. The results of our researches concerning the relationship between the amount added, the sedimentation velocity and the size of the flocs formed are tabulated below. The precipitation assistant used was the sodium salt of the partially hydrolyzed product of polyacrylamide having a molecular weight of about two millions.

| Amount Added, p.p.m. | Sedimentation Velocity, mm./min. | Size of Flocs, mm. |
|---|---|---|
| 0 | 0 | |
| 5 | 0 | 0.1–0.5 |
| 10 | 1.6 | 1–5 |
| 15 | 6 | 5–30 |
| 20 | 18 | 5–30 |
| 25 | 22 | 5–30 |
| 30 | 23 | 5–30 |
| 35 | 21 | 5–30 |

The precipitation assistant suitably used is one whose molecular weight ranges from one to three millions. When the molecular weight is lower than this range, the ability to coagulate the precipitate decreases while, on the other hand, when the molecular weight is too high, it becomes difficult to dissolve in water and is inconvenient in its use. There exists a correlation between the molecular weight and the proper amount to be added. It was found that when the molecular weight was high, the range of the proper amount to be added was on the smaller side as compared with the instance when the molecular weight was low. For example, when the molecular weight is about two millions the upper limit of the range of optimum amount to be added, based on the melamine purification waste mother liquor, is about 35 p.p.m. whereas when the molecular weight is about one million, it is about 60 p.p.m. When the amount added is such that the flocs may grow to a size of 5–30 mm. the precipitate can be separated from a greater part of the liquid by a simple procedure such as centrifuging method. For example, if the centrifuging is carried out using a super decanter, a clayey solid matter containing about 70% water is separated from the supernatant liquid. The solid matter escaping into the supernatant liquid is about 0.3–0.8% of the total solid matter.

The precipitate separated from a greater part of the liquid by means of the separation operation is subjected to the hydrolysis by heating in the presence of sulfuric acid to convert it to cyanuric acid. In this case, the higher the sulfuric acid concentration or the higher the reaction temperature, the higher the reaction velocity becomes. However, in order to avoid the disadvantages accompanying the occurrence of side reactions such as decomposition of the triazine linkage, the sulfuric acid used is one having a concentration of 10–50%, and preferably 20–40%. Good results are obtained when such sulfuric acid is added to the precipitates in a five to tenfold amount by weight of the net weight of the precipitates. The reaction temperature used in the hydrolysis is varied over the range from 110° to 250° C., and particularly to be preferred is a temperature at the atmospheric pressure ranging from 110° C. to the boiling point of the reaction mixture consisting of the precipitates and sulfuric acid, or a temperature of 150° to 250° C. under an autogenous pressure in a sealed reactor. Thus, the triazine derivatives can all be converted to cyanuric acid. Next, by cooling this hydrolyzed reaction liquid to room temperature, cynauric acid is separated as fine and white crystals. These crystals can be readily isolated from the hydrolyzed mother liquor by means of a simple filtering operation. Since about 4% of dissolved cyanuric acid still remains in the hydrolyzed waste mother liquor after the isolation of cyanuric acid, by utilizing a part of the hydrolyzed waste mother liquor for the neutralization of the starting material, the melamine purification waste mother liquor, the amount of cyanuric acid to be added to the melamine purification waste mother liquor, as previously indicated, can be reduced. Further, it is advantageous to supplement the deficient portion of the sulfuric acid in the remaining hydrolyzed waste mother liquor to raise its sulfuric acid concentration to 10–50% and then recycle it for reuse in the hydrolysis step.

Thus, according to the present invention, from the melamine purification waste mother liquor containing melamine and other triazine derivatives, which are difficult to separate and recover, more than 70% thereof can be recovered in the form of cyanuric acid. Hence, the present invention is commercially of very great advantage.

*Example 1*

A cask equipped with a stirrer was filled with 1 m.³ of melamine purification waste mother liquor containing 0.4% melamine, 0.3% ammeline, 0.3% ammelide and 0.3% NaOH, and after adding 4.5 kg. of cyanuric acid, 8 kg. of 98% sulfuric acid was added to effect the neutralization of the above liquor. Then while slowly stirring the neutralized liquor 4.5 l. of an aqueous 0.5% solution of a sodium salt of a partially hydrolyzed product of polyacrylamide having a molecular weight of about two millions was added in three installments. The precipitate consisting of melamine cyanurate, ammeline, ammelide and an excess of cyanuric acid, formed by this operation was then separated by using a super decanter and dried, after which the product was transferred to an acid-resistant vessel equipped with a reflux condenser. The hydrolysis was then carried out by adding 90 kg. of sulfuric acid and maintaining with stirring at 120° C. for 3 hours. Cyanuric acid deposited after cooling was separated by filtration, washed with water and dried to obtain 11.9 kg. of cyanuric acid having a purity of 99.5%. The yield of cyanuric acid, as calculated on the basis of the quantity obtained by subtracting 4.5 kg. which is the amount of cyanuric acid added at the beginning, from the amount of the product finally obtained, was 73%.

*Example 2*

One cubic meter of a melamine purification waste mother liquor containing 0.4% melamine, 0.7% ammeline, 0.3% ammelide and 0.3% NaOH was placed in a stirrer-equipped cask, and by adding with stirring 2.5 kg. of cyanuric acid and then 40 kg. of the hydrolyzed waste mother liquor containing 4% cyanuric acid which was obtained in Example 1, precipitates consisting of melamine cyanurate, ammeline, ammelide and an excess of cyanuric acid was formed. And then as a precipitation assistant 30 g. of an aqueous solution of ammonium salt of partially hydrolyzed product of polyacrylamide having a molecular weight of about two millions were added. Finally the precipitates were separated and dried.

The separated precipitates were transferred to an acid-resistant vessel and then by adding 90 kg. of the remainder of the hydrolyzed waste mother liquor as stated in Example 1 whose sulfuric acid concentration was adjusted to 35% by adding fresh sulfuric acid, followed by heating for 3 hours at 120° C., the hydrolysis of the precipitate was carried out. Then, by cooling to room temperature and filtering, cyanuric acid was separated from the hydrolyzed waste mother liquor. The separated cyanuric acid was washed with water and dried to obtain 13.9 kg. thereof having a purity of 99.5%. The yield was 81.1%.

*Example 3*

To 1 l. of a melamine purification waste mother liquor containing 0.4% melamine, 0.7% ammeline, 0.3% ammelide and 0.3% NaOH was added with 2.5 g. cyanuric acid and then, as in Example 2, 40 g. of the hydrolyzed waste mother liquor containing 4% cyanuric acid to obtain precipitates consisting of melamine cyanurate, ammeline, ammelide and an excess of cyanuric acid. The precipitates were separated and dried. These precipitates were placed in 200 cc. glass tube, followed by adding 90 g. of the aforesaid hydrolyzed waste mother liquor whose sulfuric acid concentration was adjusted to 20%, after which the tube was sealed and the hydrolysis of the precipitates was carried out by heating the tube for 1 hour at 200° C. Then, after cooling and filtration, the resulting cyanuric acid was separated from the hydrolyzed waste mother liquor. By washing with water and drying, 16.1 g. of cyanuric acid having a purity of 99.5% was obtained at a yield of 95%.

What we claim is:

1. A process for producing cyanuric acid from the waste mother liquor resulting from the purification of melamine, said process comprising the steps of:
   (1) adding to a melamine purification waste mother liquor, which is discharged during the purification of crude melamine by the recrystallization procedure using a dilute aqueous alkaline solution, cyanuric acid in an amount at least equivalent to the melamine remaining dissolved in said mother liquor,
   (2) adding sulfuric acid in an amount so that the pH of said mother liquor may be set within the range from 8 to 5.5 to form precipitates,
   (3) separating said precipitates,
   (4) subjecting the separated precipitates to hydrolysis at a temperature ranging between 110° and 250° C. in the presence of sulfuric acid, and
   (5) cooling the reaction product of hydrolysis to deposit cyanuric acid as crystals and collecting said crystals by isolating the same from the hydrolyzed waste mother liquor.

2. A process for producing cyanuric acid from the waste mother liquor resulting from the purification of melamine, said process comprising the steps of:
   (1) adding to a melamine purification waste mother liquor, which is discharged during the purification of crude melamine by the recrystallization procedure using a dilute aqueous alkaline solution, cyanuric acid in an amount at least equivalent to the melamine remaining dissolved in said mother liquor,
   (2) adding sulfuric acid in an amount so that the pH of said mother liquor may be set within the range from 8 to 5.5 to form precipitates,
   (3) adding to this, as a precipitation assistant, at least one anionic polymer electrolyte selected from the group consisting of the alkali and ammonium salts of polyacrylic acid, the alkali and ammonium salts of a partially hydrolyzed product of polyacrylamide, and the alkali and ammonium salts of a partially hydrolyzed product of polyacrylonitrile, thereby to render said precipitates into a readily precipitatable form,
   (4) separating said precipitates,
   (5) subjecting the separated precipitates to hydrolysis at a temperature ranging between 110° and 250° C. in the presence of sulfuric acid,
   (6) cooling the reaction product of hydrolysis to deposit cyanuric acid as crystals and collecting said crystals by isolating the same from the hydrolyzed waste mother liquor.

3. The process according to claim 2 wherein said anionic polymer electrolyte of step (3) has a molecular weight ranging between about one million and about three millions.

4. The process according to claim 2 wherein said anionic polymer electrolyte of step (3) is an alkali salt of a partially hydrolyzed product of polyacrylamide having a molecular weight of about two millions and said electrolyte is added in an amount of 15 to 35 parts per million parts, based on said melamine purification waste mother liquor.

5. The process according to claim 2 wherein said anionic polymer electrolyte of step (3) is an ammonium salt of a partially hydrolyzed product of polyacrylamide having a molecular weight of about two millions and said electrolyte is added in an amount of 15 to 35 parts per million parts, based on said melamine purification waste mother liquor.

6. The process according to claim 1 wherein the concentration of said sulfuric acid of step (4) is varied over the range from 10 percent to 50 percent.

7. The process according to claim 2 wherein the concentration of said sulfuric acid of step (5) is varied over the range from 10 percent to 50 percent.

8. The process according to claim 1 wherein said sulfuric acid of step (4) is present in a five to tenfold amount of the net weight of said precipitates.

9. The process according to claim 2 wherein said sulfuric acid is present in a five to tenfold amount of the net weight of said precipitates.

10. The process according to claim 1 wherein the temperature of step (4) at atmospheric pressure ranges between 110° C. and the boiling point of said mixture of the precipitates and sulfuric acid.

11. The process according to claim 2 wherein the temperature of step (5) at atmospheric pressure ranges between 110° C. and the boiling point of said mixture of the precipitates and sulfuric acid.

12. The process according to claim 1 wherein the temperature of step (4) ranges between 150 and 250° C. under an autogenous pressure.

13. The process according to claim 2 wherein the temperature of step (5) ranges between 150° and 250° under an autogenous pressure.

14. The process according to claim 1 wherein a part of the hydrolyzed waste mother liquor stated in step (5) is used instead of sulfuric acid added in step (2).

15. The process according to claim 2 wherein a part of the hydrolyzed waste mother liquor stated in step (6) is used instead of sulfuric acid added in step (2).

16. The process according to claim 1 wherein the concentration of sulfuric acid in the hydrolyzed waste mother liquor as stated in step (5) is adjusted to 10–50% and then used instead of sulfuric acid added in step (4).

17. The process according to claim 2 wherein the concentration of sulfuric acid in the hydrolyzed waste mother liquor as stated in step (6) is adjusted to 10–15% and then used instead of sulfuric acid added in step (5).

References Cited

UNITED STATES PATENTS

| | | | |
|---|---|---|---|
| 2,768,167 | 10/1956 | Marzluff et al. | 260—248 |
| 2,816,099 | 12/1957 | Young et al. | 260—248 |
| 2,918,467 | 12/1959 | Hibbitts et al. | 260—248 |
| 2,943,088 | 6/1960 | Westfall | 260—248 |
| 2,999,093 | 9/1961 | Christian | 260—248 |

WALTER A. MODANCE, *Primary Examiner.*

JOHN M. FORD, *Assistant Examiner.*